US011650351B2

United States Patent
Liu et al.

(10) Patent No.: US 11,650,351 B2
(45) Date of Patent: May 16, 2023

(54) SEMI-SUPERVISED DEEP MODEL FOR TURBULENCE FORECASTING

(71) Applicant: NEC Laboratories America, Inc., Princeton, NJ (US)

(72) Inventors: Yanchi Liu, Monmouth Junction, NJ (US); Jingchao Ni, Princeton, NJ (US); Bo Zong, West Windsor, NJ (US); Haifeng Chen, West Windsor, NJ (US); Zhengzhang Chen, Princeton Junction, NJ (US); Wei Cheng, Princeton Junction, NJ (US); Denghui Zhang, Urbana, IL (US)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 17/165,515

(22) Filed: Feb. 2, 2021

(65) Prior Publication Data

US 2021/0255363 A1 Aug. 19, 2021

Related U.S. Application Data

(60) Provisional application No. 62/975,287, filed on Feb. 12, 2020.

(51) Int. Cl.
*G01W 1/00* (2006.01)
*G06N 3/08* (2006.01)
(Continued)

(52) U.S. Cl.
CPC ............ *G01W 1/00* (2013.01); *G06N 3/0454* (2013.01); *G06N 3/08* (2013.01); *G01W 1/02* (2013.01);
(Continued)

(58) Field of Classification Search
CPC ... G01W 1/00; G01W 2001/003; G01W 1/10; G01W 1/02; G06N 3/0454; G06N 3/08; (Continued)

(56) References Cited

FOREIGN PATENT DOCUMENTS

| CN | 110083977 A | * | 8/2019 | |
|----|-------------|---|--------|------|
| CN | 110332990 A | * | 10/2019 | ................ G01J 1/42 |

(Continued)

OTHER PUBLICATIONS

Liu et al. (Predicting Aircraft Trajectories: A Deep Generative Convolutional Recurrent Neural Networks Approach, Institutes of Transportation Studies, University of California, Berkeley, Dec. 2018) (Year: 2018).*

(Continued)

*Primary Examiner* — Daniel R Miller
*Assistant Examiner* — Christian T Bryant
(74) *Attorney, Agent, or Firm* — Joseph Kolodka (57) ABSTRACT

A method for employing a unified semi-supervised deep learning (DL) framework for turbulence forecasting is presented. The method includes extracting historical and forecasted weather features of a spatial region, calculating turbulence indexes to fill feature cubes, each feature cube representing a grid-based 3D region, and building an encoder-decoder framework based on convolutional long short-term memory (ConvLSTM) to model spatio-temporal correlations or patterns causing turbulence. The method further includes employing a dual label guessing component to dynamically integrate complementary signals from a turbulence forecasting network and a turbulence detection network to generate pseudo-labels, reweighing the generated pseudo-labels by a heuristic label quality detector based on KL-Divergence, applying a hybrid loss function to predict turbulence conditions, and generating a turbulence dataset including the predicted turbulence conditions.

20 Claims, 8 Drawing Sheets

(51) Int. Cl.
*G06N 3/02* (2006.01)
*G01W 1/10* (2006.01)
*G06N 20/00* (2019.01)
*G01W 1/02* (2006.01)
*G06N 3/04* (2006.01)
*G06N 5/00* (2023.01)
*G06N 3/088* (2023.01)

(52) U.S. Cl.
CPC ........ *G01W 1/10* (2013.01); *G01W 2001/003* (2013.01); *G06N 3/02* (2013.01); *G06N 3/0445* (2013.01); *G06N 3/088* (2013.01); *G06N 5/003* (2013.01); *G06N 20/00* (2019.01)

(58) Field of Classification Search
CPC ...... G06N 3/0445; G06N 3/088; G06N 20/00; G06N 3/02; G06N 5/003
See application file for complete search history.

(56) References Cited

FOREIGN PATENT DOCUMENTS

| CN | 111242222 A | * | 6/2020 | ........... G06K 9/6256 |
| CN | 111242355 A | * | 6/2020 | |

OTHER PUBLICATIONS

Lo et al. (Prognosis of Bearing and Gear Wears Using Convolutional Neural Network with Hybrid Loss Function, Sensors 2020, 20(12), 3539; https://doi.org/10.3390/s20123539, Jun. 22, 2020) (Year: 2020).*

Qi et al. (Using machine learning to predict extreme events in complex systems. Proc Natl Acad Sci U S A. Jan. 7, 2020;117(1):52-59. doi: 10.1073/pnas. 1917285117. Epub Dec. 23, 2019. PMID: 31871152; PMCID: PMC6955342.) (Year: 2019).*

Anwar et al, "Machine learning approach for turbulence forecasting using support vector machine", IOP Conference Series: Materials Science and Engineering, vol. 725, Jul. 25, 2019. pp. 1-6.

Ellrod et al, "An Objective Clear-Air Turbulence Forecasting Technique: Verification and Operational Use", Satellite Applications Laboratory. Sep. 12, 1991. pp. 150-165.

Faghmous et al, "Computing and Climate", Computing in Science & Engineering, vol. 17, No. 6. Oct. 28, 2015. pp. 6-8.

Jia et al, "Spatial Context- Aware Networks for Mining Temporal Discriminative Period in Land Cover Detection", May 2, 2019. pp. 513-521.

Karpatne et al, "Monitoring Land-Cover Changes", Advances in Machine Learning for Remote Sensing and Geosciences. Jun. 13, 2016. pp. 8-21.

Koshyk et al, "The Horizontal Kinetic Energy Spectrum and Spectral Budget Simulated by a High-Resolution Troposphere-Stratosphere-Mesosphere GCM", Journal of the Atmospheric Sciences, vol. 58, No. 4. Feb. 15, 2001. pp. 329-349.

Moghaddam et al, "A deep learning framework for turbulence modeling using data assimilation and feature extraction", arXiv:1802.06106 [cs.CV]. Feb. 16, 2018. pp. 1-9.

Nayak et al, "Spatio-temporal classification at multiple resolutions using multi-view regularization", 2019 IEEE International Conference on Big Data, Dec. 9, 2019 pp. 4117-4120.

Sharman et al, "An Integrated Approach to Mid- and Upper-Level Turbulence Forecasting", Research Applications Laboratory, National Center for Atmospheric Research. Dec. 1, 2005. pp. 268-287.

Tung et al, "The k-3 and k-5/3 Energy Spectrum of Atmospheric Turbulence: Quasigeostrophic Two-Level Model Simulation", Journal of the Atmospheric Sciences. vol. 60. Sep. 26, 2002. pp. 824-835.

Wang et al, "Deep Uncertainty Quantification: A Machine Learning Approach for Weather Forecasting", Applied Data Science Track Paper, KDD '19. Aug. 4, 2019. pp. 2087-2095.

Wang et al, "Towards physics-informed deep learning for turbulent flow prediction", Knowledge Discovery and Data Mining, 2020. Aug. 23, 2020. pp. 1457-1465.

Zhu et al, "Machine learning methods for turbulence modeling in subsonic flows around airfoils", School of Aeronautics, Northwestern Polytechnical University, Jan. 16, 2019, pp. 1-24.

* cited by examiner

$$i_t = \sigma(W_{xi} \circledast X_t + W_{hi} \circledast H_{t-1} + W_{ci} \circ C_{t-1} + b_i)$$

$$f_t = \sigma(W_{xf} \circledast X_t + W_{hf} \circledast H_{t-1} + W_{cf} \circ C_{t-1} + b_f)$$

$$C_t = f_t \circ C_{t-1} + i_t \circ tanh(W_{xc} \circledast X_t + W_{hc} \circledast H_{t-1} + b_c)$$

$$o_t = \sigma(W_{xo} \circledast X_t + W_{ho} \circledast H_{t-1} + W_{co} \circ C_t + b_o)$$

$$H_t = o_t \circ tanh(C_t)$$

904

$$\text{Conv}(X_i, 1) = f_1(X_i \circledast W_1 + b_1)$$

$$\text{Conv}(X_i, l) = f_l(\text{Conv}(X_i, l-1) \circledast W_l + b_l)$$

$$P_i = \text{Softmax}(\text{Conv}(X_i, l)), i \in [n+1, n+p]$$

906

$$p = \frac{\Psi(p^{TDN}, p^{TFN}, \tau(t)) \oplus \Psi(p^{TDN}, p^{TFN}, \tau(t))}{2}$$

FIG. 8

SEMI-SUPERVISED DEEP MODEL FOR TURBULENCE FORECASTING

RELATED APPLICATION INFORMATION

This application claims priority to Provisional Application No. 62/975,287, filed on Feb. 12, 2020, the contents of which are incorporated herein by reference in their entirety.

BACKGROUND

Technical Field

The present invention relates to turbulence forecasting and, more particularly, to a semi-supervised deep model for turbulence forecasting.

Description of the Related Art

Turbulence forecasting is beneficial to airlines by guiding them to reroute airplanes to avoid turbulence. However, turbulence forecasting is difficult due to being a "microscale" phenomenon. In the atmosphere, turbulent "eddies" vary in size, from hundreds of kilometers down to centimeters. But aircraft bumpiness is most pronounced only when the turbulent eddies and aircraft are similar in size. It is impossible to directly and routinely forecast atmospheric motion at this scale, now or even in the foreseeable future. Fortunately, most of the energy associated with turbulent eddies on this scale cascade down from the larger scales of atmospheric motion, and these larger scales may be resolved by numerical weather prediction (NWP) models. Based on NWP, various effective turbulence indexes, e.g., high-level features calculated based on basic weather features, are proposed by meteorologists. Although turbulence index-based methods achieve acceptable results on turbulence forecasting, there is still huge potential for improvement since research relating to the utilization of modern machine learning on turbulence forecasting is nearly non-existent.

SUMMARY

A computer-implemented method for employing a unified semi-supervised deep learning (DL) framework for turbulence forecasting is presented. The method includes extracting historical and forecasted weather features of a spatial region, calculating turbulence indexes to fill feature cubes, each feature cube representing a grid-based 3D region, building an encoder-decoder framework based on convolutional long short-term memory (ConvLSTM) to model spatio-temporal correlations or patterns causing turbulence, employing a dual label guessing component to dynamically integrate complementary signals from a turbulence forecasting network and a turbulence detection network to generate pseudo-labels, reweighing the generated pseudo-labels by a heuristic label quality detector based on KL-Divergence, applying a hybrid loss function to predict turbulence conditions, and generating a turbulence dataset including the predicted turbulence conditions.

A non-transitory computer-readable storage medium comprising a computer-readable program is presented for employing a unified semi-supervised deep learning (DL) framework for turbulence forecasting, wherein the computer-readable program when executed on a computer causes the computer to perform the steps of extracting historical and forecasted weather features of a spatial region, calculating turbulence indexes to fill feature cubes, each feature cube representing a grid-based 3D region, building an encoder-decoder framework based on convolutional long short-term memory (ConvLSTM) to model spatio-temporal correlations or patterns causing turbulence, employing a dual label guessing component to dynamically integrate complementary signals from a turbulence forecasting network and a turbulence detection network to generate pseudo-labels, reweighing the generated pseudo-labels by a heuristic label quality detector based on KL-Divergence, applying a hybrid loss function to predict turbulence conditions, and generating a turbulence dataset including the predicted turbulence conditions.

A system for employing a unified semi-supervised deep learning (DL) framework for turbulence forecasting is presented. The system includes a memory and one or more processors in communication with the memory configured to extract historical and forecasted weather features of a spatial region, calculate turbulence indexes to fill feature cubes, each feature cube representing a grid-based 3D region, build an encoder-decoder framework based on convolutional long short-term memory (ConvLSTM) to model spatio-temporal correlations or patterns causing turbulence, employ a dual label guessing component to dynamically integrate complementary signals from a turbulence forecasting network and a turbulence detection network to generate pseudo-labels, reweigh the generated pseudo-labels by a heuristic label quality detector based on KL-Divergence, apply a hybrid loss function to predict turbulence conditions, and generate a turbulence dataset including the predicted turbulence conditions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

While most existing turbulence forecasting methods rely on turbulence indexes, however, it is observed that solely using manually crafted features is usually suboptimal, yielding unsatisfactory accuracy. Moreover, turbulence indexes have poor generalization power to adapt to new data, and cannot handle more complex situations such as climate change. On the other hand, weather forecasting issues can be solved in a more effective and automatic manner by using deep learning approaches, whereas research on applying advanced machine learning models to turbulence forecasting remain few and far between. To this end, the exemplary embodiments of the present invention systematically investigate the utility of a variety of machine learning methods on this task, using turbulence events recorded by pilot reports as ground truth labels. Nevertheless, at least the following challenges remain:

Complex spatio-temporal correlations. Turbulence is in nature a spatio-temporal phenomenon of air movements. Turbulence can occur as a result of various conditions, including proximity to the jet stream, mountain waves, or convective activity such as thunderstorms. These conditions can be depicted or captured by certain combinations of raw meteorological features of the surrounding area and adjacent time slots. Most existing turbulence forecasting approaches only consider the static features of the target area but neglect the spatio-temporal features of surrounding areas.

Label scarcity. Under the paradigm of supervised learning, a large number of turbulence labels are essential to provide signals for training a statistical turbulence model. However, the turbulence label is very scarce in the real-world because turbulence is a rare and anomaly event, and turbulence can only be recorded when a pilot happens to pass through the same area at the same time of the turbulence. Data with scarce labels, e.g., 0.05% cubes with pilot reports, largely limits the power of statistical learning.

Label imbalance. Not only are turbulence labels hard to collect, but the label distribution is also highly imbalanced. According to statistics of a 7-day's pilot report dataset, only 30% of the labels are labeled with "moderate or greater" (MOG) while only 0.5% are labeled as "severe." Statistical models, trained on the skewed data, usually incline to the majority class, causing an unsatisfying performance on the minority classes.

Figure 1:
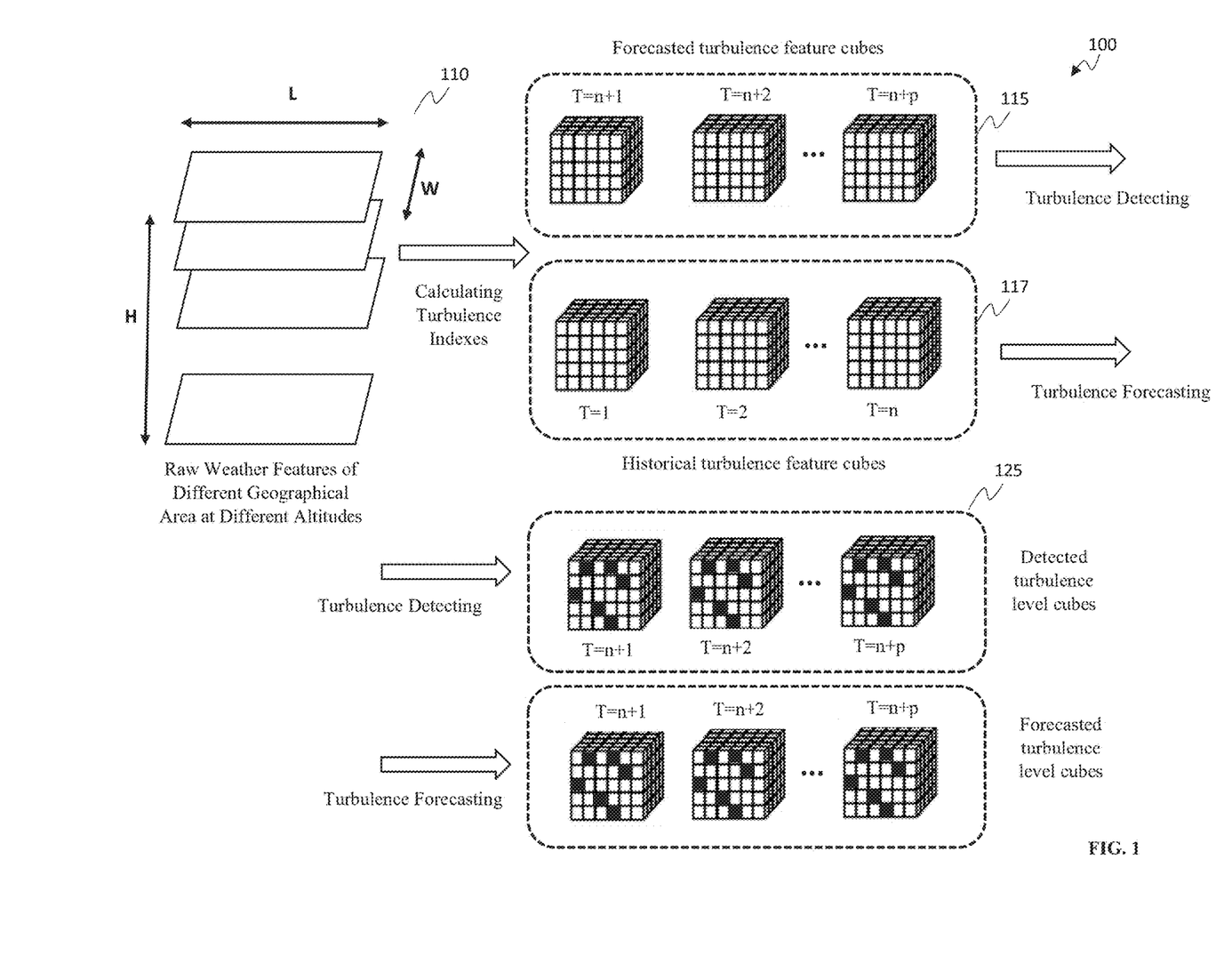
FIG. 1 is a block/flow diagram of an exemplary turbulence forecasting network, in accordance with embodiments of the present invention.

To address the above challenges, the exemplary embodiments present a unified semi-supervised learning framework for turbulence forecasting 100, namely, $T^2$-Net. As shown in FIG. 1, $T^2$-Net includes a turbulence forecasting model and a turbulence detection model, which are co-trained in a semi-supervised manner. Specifically, the exemplary embodiments first extract historical and forecasted weather features 110 (provided by numerical weather prediction (NWP) models) of a spatial region and calculate turbulence indexes to "fill" the feature cubes 115. Similarly, the label cubes 125 are filled by the extracted sparse turbulence labels. Then, an encoder-decoder paradigm, built upon the convolutional long short-term memory (LSTM) (or ConvL-STM), is employed to learn the complex spatio-temporal patterns causing turbulence automatically. Next, to fully utilize the unlabeled data and alleviate the label scarcity issue, the exemplary embodiments introduce an auxiliary task, Turbulence Detection 220 (FIG. 2), along with the main task of Turbulence Forecasting 240 (FIG. 2), and further introduces a dual label guessing method 210 (FIG. 2), which dynamically integrates complementary signals from these two tasks to generate robust pseudo-labels. These pseudo-labels are then adopted as ground truth 215 and added into the training loop for better generalization ability. Meanwhile, to minimize the effect of "bad" pseudo-labels, the exemplary embodiments introduce a heuristic Label Quality Detector (LQD) 212 based on KL-Divergence and re-weighting data by the label quality score. Moreover, to mitigate the label imbalance issue, the exemplary embodiments devise a hybrid loss function including a focal loss for the labeled data and weighted-L2 for the pseudo-labels, respectively. Finally, the exemplary embodiments create a large-scale real-world turbulence dataset, in which the feature data is collected from national Oceanic and Atmospheric Administration (NOAA) weather records while the label data is extracted from public pilot reports. Hence the exemplary approach can greatly alleviate the problem of spatio-temporal correlation modeling, label scarcity, and label imbalance on turbulence forecasting.

Regarding turbulence forecasting, the exemplary embodiments formulate the turbulence forecasting problem as a sequence-to-sequence multi-class classification problem. That is to say, given the historical feature cubes (a cube representing a grid-based 3D region) at previous time slots, $X_1, X_2, \ldots, X_n \in \mathbb{R}^{\mathcal{L} \times \mathcal{W} \times \mathcal{H} \times C}$, the method aims to predict the turbulence levels of all grids in this 3D region at the next few time slots, e.g., $Y_{n+1}, Y_{n+2}, \ldots, Y_{n+p} \in \mathbb{R}^{\mathcal{L} \times \mathcal{W} \times \mathcal{H} \times 4}$. $\mathcal{L} \times \mathcal{W} \times \mathcal{H}$ indicates the size (number of grids) of the 3D region, C is the number of channels/features per grid, and 4 denotes the number of turbulence classes. Each time slot could be, for example, an hour, 3 hours, or a day. Let $X = [X_1, X_2, \ldots X_n]$, $Y = [Y_{n+1}, Y_{n+2}, \ldots Y_{n+p}]$, according to the theory of Empirical Risk Minimization (ERM), the exemplary embodiments aim to train a statistical model $\mathcal{F}(\bullet; \theta_{TFN})$, that, given X, yields a forecast sequence $\mathcal{P}_{TFN}$ fitting Y: $\mathcal{P}_{TFN} = \mathcal{F}(X; \theta_{TFN})$.

The exemplary embodiments set $\mathcal{L} \times \mathcal{W} \times \mathcal{H} = 10 \times 10 \times 5$ for computation efficiency and flexibility. The exemplary embodiments choose one hour as the length of a time slot, in other words, the exemplary embodiments use the previous n hours' feature cubes to forecast the hourly turbulence level of the next p hours. In FIG. 1, element 117 shows an illustration of turbulence forecasting.

Figure 2:
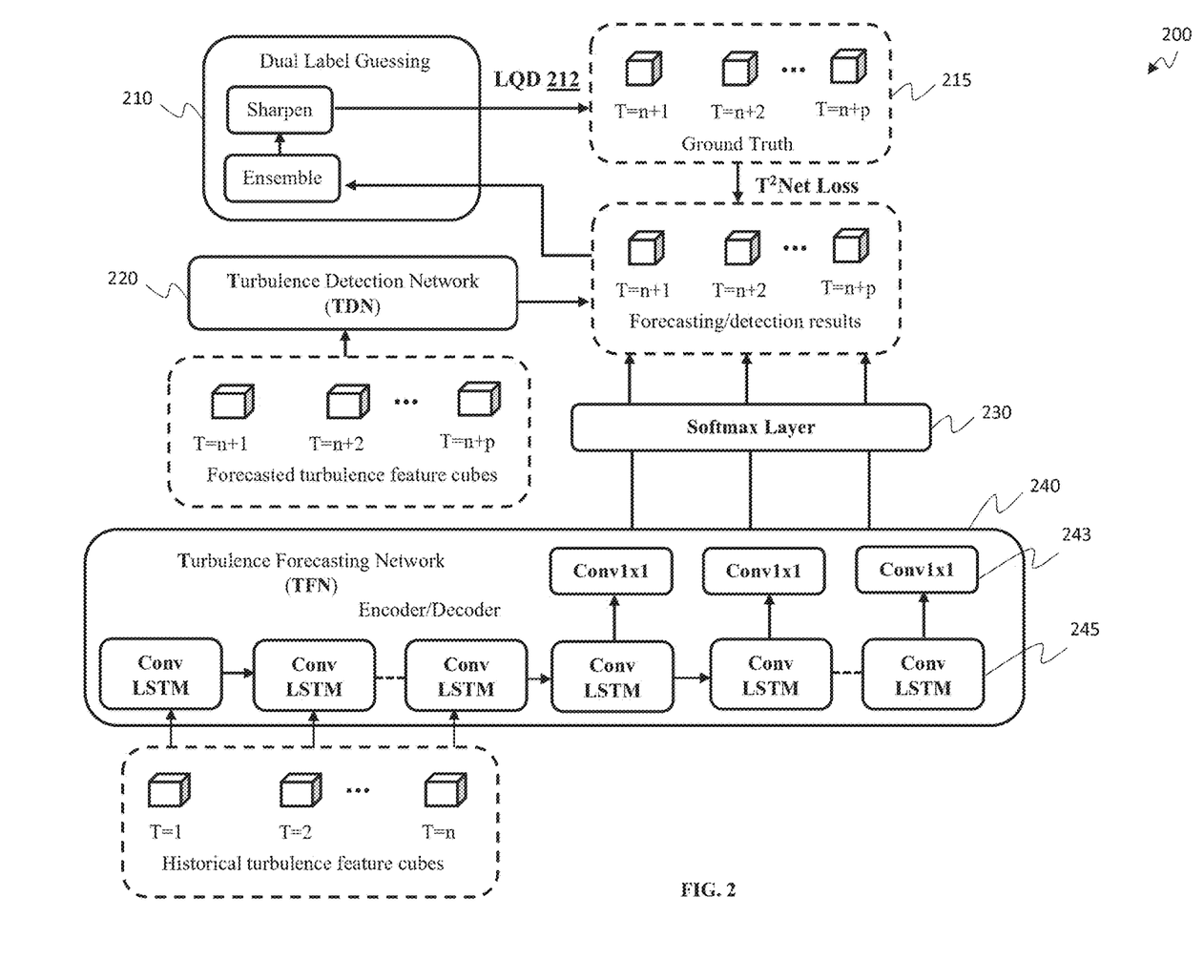
FIG. 2 is a block/flow diagram of an exemplary architecture of a $T^2$-Net, in accordance with embodiments of the present invention.

Regarding turbulence detection, turbulence detection is a similar task to forecasting which serves as an auxiliary task in $T^2$-Net 200. Given the NWP forecasted feature cube of a time slot i, e.g., $X_i \in \mathbb{R}^{\mathcal{L} \times \mathcal{W} \times \mathcal{H} \times C}$, turbulence detection aims to predict turbulence conditions of all grids in this 3D region at the same time slot, e.g., $Y_i \in \mathbb{R}^{\mathcal{L} \times \mathcal{W} \times \mathcal{H} \times 4}$. According to ERM theory again, the exemplary embodiments need to train a statistical model $\mathcal{F}(\bullet; \theta_{TFN})$, that, given Xi, returns detection result $\mathcal{P}_{i,TDN}$ fitting Yi: $\mathcal{P}_{i,TDN} = \mathcal{F}(X_i; \theta_{TDN})$.

A detection task differs from a forecasting task as follows: Synchroneity, i.e., its features are forecasted based on NWP models and synchronized with the turbulence labels. It aims to detect future turbulence using future features while forecasting aims to predict future turbulence using past features. Static, it is also easier since it only predicts one step at one time. These two tasks share the same target but have different input features and hold different properties. The exemplary embodiments utilize both turbulence forecasting and detection to provide complementary guidance for the pseudo label generation.

Regarding features, in each grid of a feature cube, the exemplary embodiments fill it with 12 relevant features (thus C=12) as shown in Table I, reproduced below. The first 6 of them are raw weather features while the remaining 6 are turbulence indexes invented by meteorologists. Raw features such as temperature, wind component, and pressure can be considered as fundamental features and certain combinations of these features in adjacent areas may contribute to the occurrence of turbulence. Deep neural networks, such as convolutional neural networks, are capable of learning such complex spatial correlations and it is necessary to keep the raw features. The exemplary embodiments further apply 6 turbulence indexes as extra features to enhance the model capacity. Most of these features are proposed by previous meteorologists and are usually adopted independently or integrated by a weighted sum in a turbulence forecasting system. The exemplary embodiments regard them as prior knowledge and concatenate with raw features to form each feature grid in the feature cubes. The exemplary embodiments collect these feature data from NOAA.

TABLE I

Raw features and turbulence indexes

| Notation | Name | Unit |
| --- | --- | --- |
| $v_u$ | U component of wind | $ms^{-1}$ |
| $v_v$ | V component of wind | $ms^{-1}$ |
| T | Temperature | K |
| H | Relative humidity | % |
| V | Vertical velocity | $Pas^{-1}$ |
| P | Pressure | Pa |
| Ri | Richardson Number | — |
| CP | Colson Panofsky Index | $kt^2$ |
| $TI_1$ | Ellrod Indices | $s^{-2}$ |
| $|v|$ | Wind Speed | $ms^{-1}$ |
| $|\nabla_H T|$ | Horizontal Temperature Gradient | $Km^{-1}$ |
| $|v|DEF$ | MOS CAT Probability Predictor | $ms^{-2}$ |

Regarding the labels, Table II, reproduced below, presents the labels of the task, e.g., the turbulence levels, as well as the proportion of each class in the data. The label indicates the severity of the turbulence, corresponding to a real turbulence event recorded by pilot reports. After gathering the feature data and label data, the exemplary embodiments align them by time.

TABLE II

Labels on turbulence levels

| | Code | | | |
| --- | --- | --- | --- | --- |
| | /NEG | /LGT | /MOD | /SEV |
| Name | negative | light | moderate | severe |
| Proportion(%) | 47.79 | 21.55 | 30.12 | 0.154 |

According to statistics of the pilot reports, at each hour, there are only 0.05% grids of North American air space that are labeled with a turbulence level while 99.95% are unknown. In addition, about 50% of the labeled grids are "negative" and only less than 1% are "severe." Hence the label of the turbulence data is extreme scarce and highly imbalanced. This imposes great challenges to effective turbulence forecasting. First, label scarcity limits the supervision signals a model can learn from. Second, label imbalance leads to class skew, e.g., a model tends to predict the majority classes. Next, the $T^2$-Net is introduced, which is a semi-supervised model for turbulence forecasting that alleviate such issues.

As shown in FIG. 2, $T^2$-Net 200 includes a Turbulence Forecasting Network (TFN) 240 and a Turbulence Detection Network (TDN) 220. TFN 240 serves for the main task, that is, the forecasting task, while TDN 220 serves for the auxiliary task, that is, the turbulence detection, which provides complementary semi-supervised signals for the main task. Based on the predictions of TFN 240 and TDN 220, a dual label guessing approach 210 is introduced to fuse these two sources of information to generate more robust pseudo-labels as additional training data. To minimize the effect of "bad" pseudo-labels, the exemplary embodiments reweigh the grids tagged with pseudo-labels by the heuristic Label Quality Detector (LQD) 212 based on the quality scores and adds them into the training loop dynamically. Finally, the exemplary embodiments introduce a hybrid loss function including a focal loss and weighted-L2 loss to alleviate the label imbalance issue.

TFN 240 is designed on top of the ConvLSTM architecture 245 to model the complex spatio-temporal correlations among different spatial grids. ConvLSTM 245 is a variation of LSTM to handle spatio-temporal prediction tasks. ConvLSTM 245 extends basic LSTM cell by replacing the fully connected layer with the convolution operation in the internal transitions. The equations of ConvLSTM 245 are shown in the below, where Xt, $o_t$, $H_t$ are the input, output, and hidden vectors, respectively, "$\circledast$" denotes the 3D-convolution operator, and "$\circ$" denotes the Hadamard product.

$$i_t = \sigma(W_{xi} \circledast X_t + W_{hi} \circledast H_{t-1} + W_{ci} \circ C_{t-1} + b_i)$$

$$f_t = \sigma(W_{xf} \circledast X_t + W_{hf} \circledast H_{t-1} + W_{cf} \circ C_{t-1} + b_f)$$

$$C_t = f_t \circ C_{t-1} + i_t \circ \tan h(W_{xc} \circledast X_t + W_{hc} \circledast H_{t-1} + b_c)$$

$$o_t = \sigma(W_{xo} \circledast X_t + W_{ho} \circledast H_{t-1} + W_{co} \circ C_t + b_o)$$

$$H_t = o_t \circ \tan h(C_t)$$

As shown in FIG. 2, TFN 240 includes two ConvLSTMs, serving as the encoder and decoder, respectively. The encoder takes a sequence of 4D tensors as input, $X_1, X_2, \ldots, X_n \in \mathbb{R}^{\mathcal{L} \times \mathcal{W} \times \mathcal{H} \times C}$, e.g., the historical turbulence feature cubes 117 of time slots $1, \ldots, n$. $\mathcal{L} \times \mathcal{W} \times \mathcal{H}$ is the shape of a grid-based 3D region and C is the number of channels/features for each grid. The decoder takes the last hidden state of the encoder as the initial hidden state, and uses teacher forcing (using previous ground truth $Y_{j-1}$ as the next input to the decoder) to generate a sequence of features corresponding to the forecasting time slots $n+1, \ldots, n+p$.

The decoder's outputs are then fed into to a Conv1×1 block 243 followed with a Softmax layer 230 to produce the forecasted turbulence levels $P_{n+1}, P_{n+2}, \ldots, P_{n+p} \in \mathbb{R}^{\mathcal{L} \times \mathcal{W} \times \mathcal{H} \times 4}$.

The process of TFN 240 can be summarized in the following equations:

$$h_i^{enc}, o_i^{enc} = \text{ConvLSTM}^{enc}(X_i, h_{i-1}^{enc}), i \in [1, n]$$

$$h_j^{dec}, o_j^{dec} = \text{ConvLSTM}^{dec}(Y_{j-1}, h_{j-1}^{dec}), j \in [n+1, n+p]$$

$$P_j = \text{Softmax}(\text{Conv1} \times 1(o_j^{dec})), j \in [n+1, n+p]$$

Regarding the turbulence detection network, TDN 220 employs a Convolutional Neural Network to extract spatial correlations and detect the turbulence levels. The input to TDN 220 is the NWP forecasted turbulence feature cube 115

(Xi) at time slot i, and the output is the detected turbulence level cube $P_i \in \mathbb{R}^{\mathcal{L} \times \mathcal{W} \times \mathcal{H} \times 4}$ at the same time slot.

TDN can be summarized by the following equations:

$$\text{Conv}(X_i, 1) = f_1(X_1 * W_1 + b_1)$$

$$\text{Conv}(X_i, l) = f_l(\text{Conv}(X_i, l-1) * W_l + b_l)$$

$$P_i = \text{Softmax}(\text{Conv}(X_i, l)), i \in [n+1, n+p]$$

where l denotes the l-th layer, $f_l$ denotes the activation function of l-th layer, "$\circledast$" denotes the 3D convolution operator.

Regarding dual label guessing 210, as aforementioned, a major challenge of turbulence forecasting is the label scarcity issue. Given a specific timestamp, only a small portion of the spatial grids are labeled with turbulence conditions. That is, given $Y_i \in \mathbb{R}^{\mathcal{L} \times \mathcal{W} \times \mathcal{H} \times 4}$, most grids in Yi are unknown. Consequently, the exemplary embodiments have to mask these unlabeled grids during training for the purpose of bypassing the backpropagation of their gradients. This leads to less training signals available, making it difficult for the network to be trained sufficiently.

Figure 3:
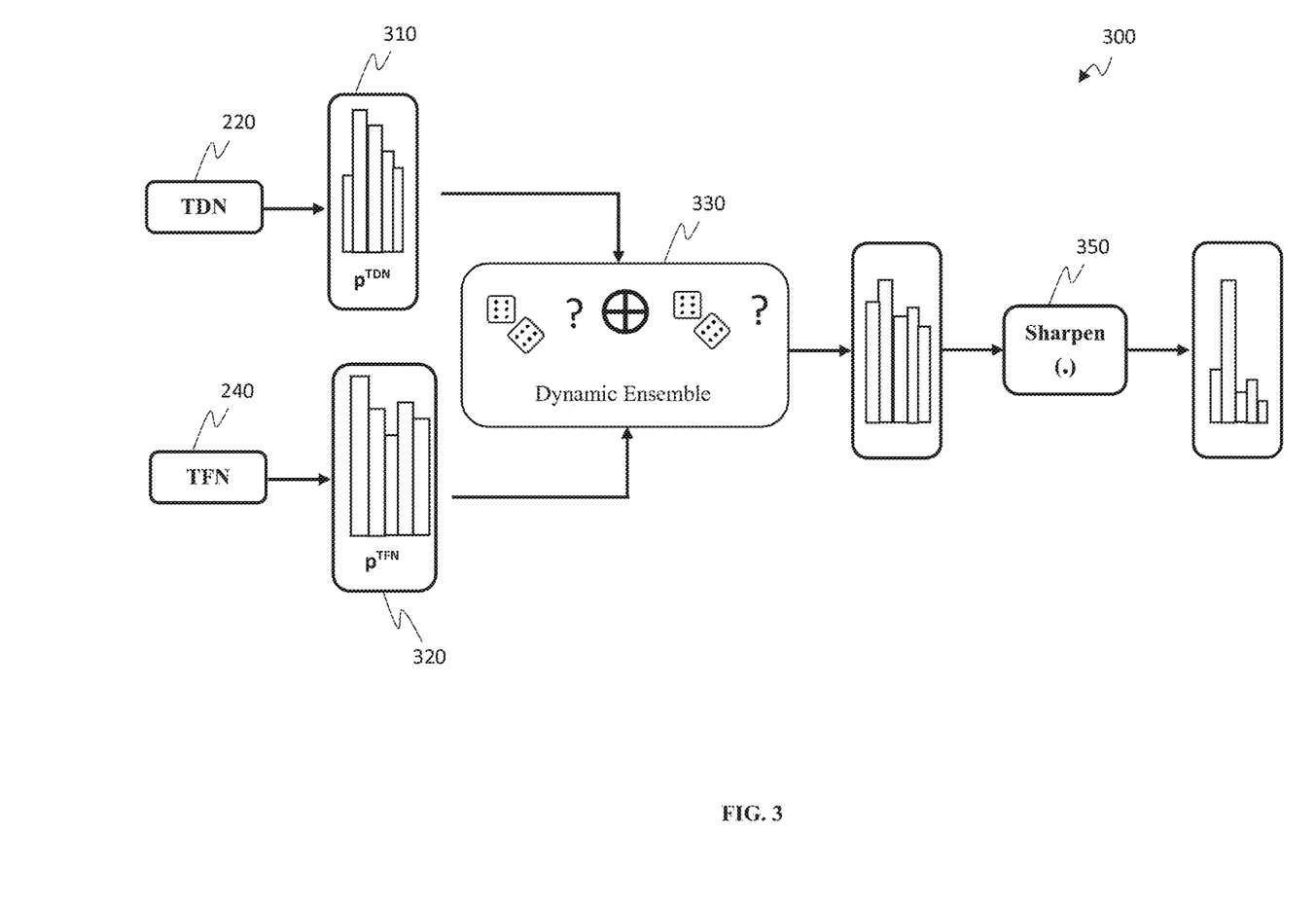
FIG. 3 is a block/flow diagram of an exemplary dual label guessing framework, in accordance with embodiments of the present invention.

In order to mitigate this issue, the exemplary embodiments introduce a dual label guessing (DLG) method 300, as illustrated in FIG. 3. During the training process, DLG generates pseudo-labels for those unlabeled grids, then these pseudo-labels are coupled with the corresponding features as ground truth and added into the training data dynamically. To highlight, DLG differs from existing "label-guessing" methods in the following ways:

Regarding complementary dual semi-supervised signals, instead of single source inference, the exemplary method leverages dual source signals from two related but different tasks. According to the ensemble learning theory, "two heads are better than one," integrating multiple diversified models as a committee could help make more robust predictions. DLG uses an elaborate Dynamic Ensemble method 330 to combine the predictions from TDN 220 and TFN 240, protecting each other from their individual errors/bias, thus getting more robust to generate high-quality pseudo-labels.

Regarding soft labels, instead of the hard label in other approaches like "pseudo-labeling," which takes the class with the highest probability and produces a one-hot label, the exemplary embodiments utilize the soft label via a "sharpening" function, thus yielding a class distribution. Compared with the hard label, the soft label is smoother and error tolerant. Accordingly, a weighted L2 loss function is devised to train it.

Regarding the dynamic ensemble 330 of TDN 220 and TFN 240, in the dual label guessing 210, the exemplary embodiments introduce the Dynamic Ensemble method 330 to fuse the predictions of TFN 240 and TDN 220 grid by grid, the combined prediction defined as:

$$p = \frac{\Psi(p^{TDN}, p^{TFN}, \tau(t)) \oplus \Psi(p^{TDN}, p^{TFN}, \tau(t))}{2}$$

Where $p^{TDN}, p^{TFN} \in \mathbb{R}^4$ are output vectors 310, 320 of a single grid predicted by TDN 220 and TFN 240 respectively, in which each element represents the probability of each turbulence class. $\oplus$ denotes element-wise addition and $\Psi$ denotes the binary sampling.

It is noted, two $\Psi$ ($p^{TDN}, p^{TFN}, \tau(t)$) in the equation are different samples and the sampling function $\Psi$ is defined as:

$$\Psi(p^{TDN}, p^{TFN}, \tau(t)) = \begin{cases} p^{TDN}, & \text{if } r(t) > \tau(t) \\ p^{TFN}, & \text{if } r(t) <= \tau(t) \end{cases}$$

r(t) above is a pseudorandom number between [0, 1] with t as the seed. $\tau(t)$ is a dynamic coefficient controlling the probability of drawing $p^{TDN}$ or $p^{TFN}$ e.g., relative importance of TDN 220 and TFN 240, r(t) is defined as a piece-wise function:

$$\tau(t) = \begin{cases} 0, & t < T_1 \\ \frac{t - T_1}{T_2 - T_1} \beta, & T_1 < t < T_2 \\ \beta, & t > T_2 \end{cases}$$

where t is the number of epochs, $T_1$, $T_2$ and $\beta$ are the hyper-parameters. The design of r(t) ensures the following intuitions. At the beginning of training, TDN 220 shall have a higher probability (in the first stage, $1-\tau(0)=1$ makes TDN 100% to be chosen), because TDN 220 is pre-trained, predicting is more accurate than TFN 240. As the iteration t increases gradually, TDN's probability should decrease and TFN's probability should increase since TFN's accuracy is growing. Finally, the binary sampling probability stabilizes at some balancing point $\beta \in (0; 1]$.

To summarize, the whole process of DLG is as follows: when it starts, TDN 220 is dominant in generating the pseudo-labels, and "sharing" its knowledge with TFN 240 through the pseudo-labels. As iterations increase, TFN 240 gradually learns to make good predictions and good "guesses," then becomes balanced with TDN 220 so that they learn from each other, yielding more robust pseudo-labels. The balancing ratio is controllable with the hyper-parameter, $\beta$.

Regarding soft labels, after getting the ensembled prediction p, to obtain the pseudo-label, the exemplary embodiments further apply a sharpening function 350 to minimize the entropy of the label distribution, which is defined as:

$$\text{Sharpen}(p, T)_i := p[i]^{\frac{1}{T}} \Big/ \sum_{j=1}^{4} p[j]^{\frac{1}{T}}$$

where p[i] is the i-th element of p, T is a hyper-parameter to adjust the "temperature" of this categorical distribution. Sharpen(p, T) (350) first calculates the T-th power of each elements and then based on which performs a normalization. When $T \to 0$, the result will approach a one-hot distribution.

Regarding the label quality detector, new pseudo-labels of unlabeled grids have been obtained to supplement training data. However, the quality of these pseudo-labels, which is vital to the final performance of the model, remains unknown. More correct labels would produce positive impacts while wrong labels are destructive to model behavior. In other words, the exemplary embodiments need to address the following questions: how to validate the quality of generated pseudo-labels? How to make better use of "good" pseudo-labels and avoid the "bad" ones? To this end, the exemplary embodiments propose a heuristic LQD 212 to monitor the quality of pseudo-labels and calculate a quality score for each grid. Next, the exemplary embodiments reassign weights to each grid based on the quality score, where grids with high-quality scores would have more of an impact on the loss function while grids with low quality have less of an impact.

The intuition of LQD 212 is that when TDN 220 and TFN 240 make more consistent predictions, the ensembled pseudo-label is more reliable. In other words, the quality is inverse to the difference between $p^{TDN}$ (310) and $p^{TFN}$ (320). Specifically, the exemplary embodiments adopt Kullback-Leibler (KL) Divergence to measure the difference between $p^{TDN}$ and $p^{TFN}$. Moreover, in order to normalize the score to the range of [0, 1], the exemplary embodiments devise a variation of KL-Divergence, which, given the pseudo-labels $p^{TDN}$ and $p^{TFN}$, is defined as:

$$LQD(p) = \exp(-D_{KL}(p^{TDN}\|p^{TFN}))$$

$$D_{KL}(p^{TDN}\|p^{TFN}) = \sum_i p_i^{TDN} \log\left(\frac{p_i^{TDN}}{p_i^{TFN}}\right)$$

LQD(p)=1 when $p^{TDN}$ and $p^{TFN}$ are identical and LQD(p)→0 when the difference is significant. The exemplary embodiments make use of this quality score by multiplying it with the loss term, as shown in the algorithm, reproduced below.

The loss function of the $T^2$-Net 200 includes two parts: $\mathcal{L}_s$, the supervised part for the labeled grids, and $\mathcal{L}_u$, the unsupervised part for the grids with pseudo-labels, where:

$$\mathcal{L} = \mathcal{L}_s + \lambda \mathcal{L}_u$$

and where $\lambda \in [0, 1]$ is a hyperparameter controlling the weight of unsupervised loss.

For the supervised loss $\mathcal{L}_s$, the exemplary embodiments adopt the Focal Loss (FL) instead of the Cross Entropy (CE) to handle the label imbalance issue. Given the multiclass prediction p and true label y of a grid, it is defined as:

$$FC(p, y) = \sum_{i=1}^{4} -I(y_i = 1)(1 - p_i)^\gamma \log(p_i)$$

where $(1-p_i)^\gamma$ is the "modulating factor." When an instance is misclassified and pi is small, the modulating factor is near 1 and the loss is unaffected. As pi→1, the factor goes to 0 and the loss for well-classified instances (the majority class of the imbalanced dataset) is downweighted. The parameter $\gamma$ smoothly adjusts the rate at which easy samples are downweighted. When $\gamma$=0, FL is equivalent to CE. When $\gamma$ increases, the effect of the modulating factor also increases.

For the unsupervised loss $\mathcal{L}_u$, L2 distance is more suitable than cross entropy since the pseudo-label is a continuous probability distribution rather than one-hot distribution. Still, to alleviate the imbalance issue, the exemplary embodiments modify L2 to weighted-L2 by adding a weighting factor $\alpha_i \in [0, 1]$, which is defined as the normalized inverse class frequency (IF):

$$\alpha_i = \frac{IF_i}{\sum_{i=1}^{4} IF_i}$$

$$IF_i = \frac{N}{N_i}$$

$$\text{weighted-}L2(p, y) = \sqrt{\sum_{i=1}^{4} \alpha_i(p_i - y_i)^2}$$

where N is the number of all samples, Ni is the number of samples of class i, IFi is the inverse class frequency. Those majority classes usually have high frequencies and thus get small $\alpha_i$ while minor classes get larger $\alpha_i$, consequently the training speed of the imbalanced data are rebalanced.

The training process of $T^2$-Net 200 is presented in the algorithm, reproduced below. TDN is first pre-trained (Line 6) before the co-training process of TFN 240 and TDN 220. In each batch, the exemplary embodiments first obtain the predictions of TDN 220 and TFN 240 via the feedforward network (Line 10-11), then the exemplary embodiments generate pseudo-labels for unlabeled grids using DLG and obtain the quality score for every pseudo-label using LQD 212 (Line 13-14). Based on these, the supervised and unsupervised losses are calculated, respectively, and the exemplary embodiments use gradient descent to update the parameters of $T^2$-Net 200 (Line 16-19). This process is repeated until convergence. After training, the exemplary embodiments use the dynamic ensemble $P^b$ as the final prediction.

---

Algorithm 1 Training $T^2$-Net

Figure 4:
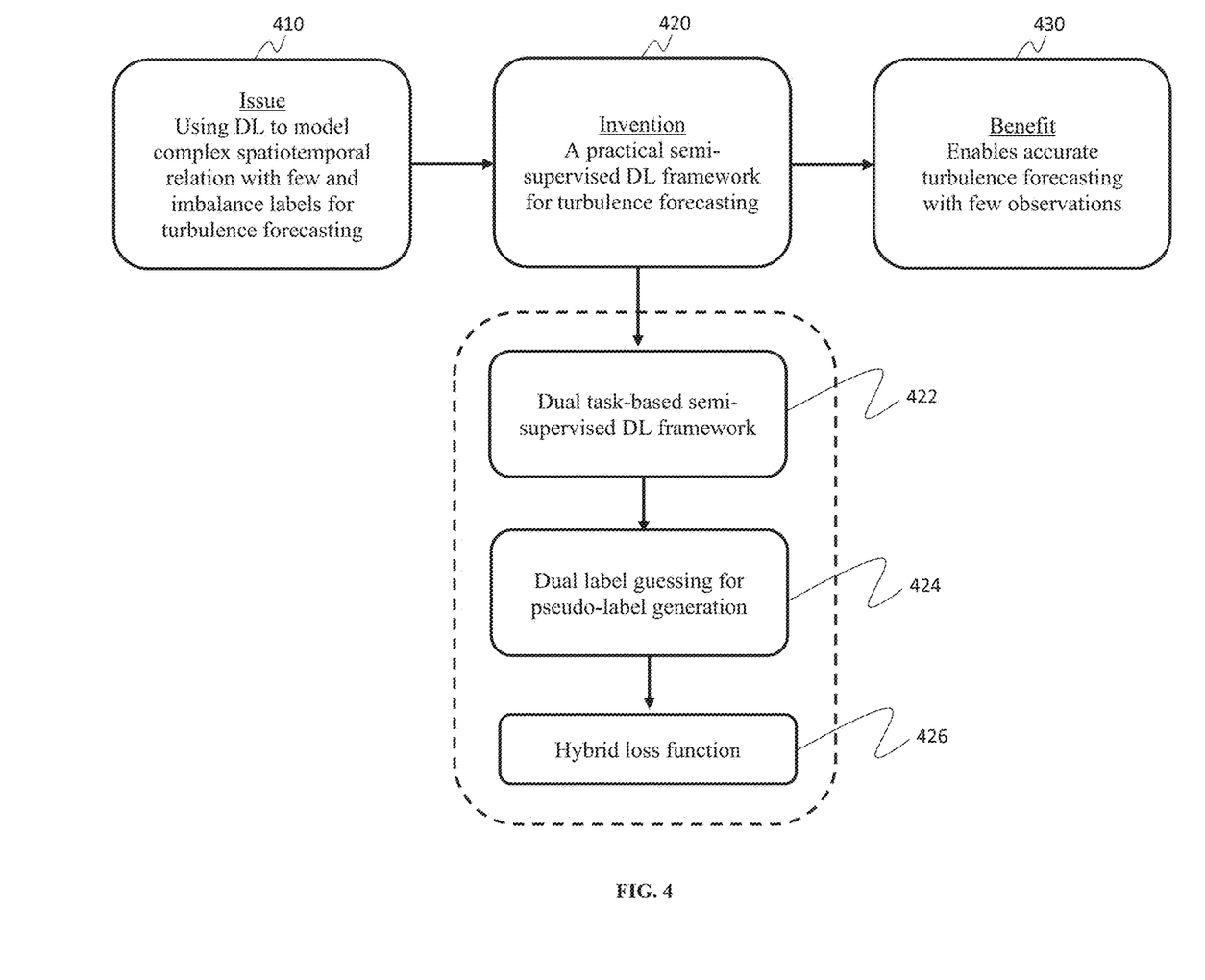
FIG. 4 is a block/flow diagram of a practical semi-supervised deep learning (DL) framework for turbulence forecasting, in accordance with embodiments of the present invention.

Input: Historical turbulence feature sequence set $\chi_h = \{(X_1, ..., X_n)\}$, forecasted turbulence feature sequence set $\chi_f = \{(X_{n+1}', ..., X_{n+p}')\}$, ground truth turbulence condition sequence set $Y = \{(Y_{n+1}, ..., Y_{n+p})\}$, the shape of feature/label cube (L, W, H), the forecasting time stamps $T = \{n+1, ..., n+p\}$.
Output: $F(; \theta_{TFN})$: parameters of trained TFN.
1:    $I_s = \{\text{mask untried grids, keep labeled}\}$.
2:    $I_u = \{\text{mask labled grids, keep unlabeled}\}$.
3:    Let ||·|| denote the weighted-L2.
4:    Let ○ denote the Hadamard product.
5:    FC(·) and ||·||, first calculate element-wise losses and then return the cube of losses with shape (L, W, H).
6:    Pre-train $F(; \theta_{TDN})$ based on $(\chi_f, Y)$.
7:    while not converge do
8:        sample a batch B from $(\chi_h, \chi_f, Y)$;
9:        for $(X_h^b, X_f^b, Y^b) \in B$ do
10:         $P_{TFN}^b = F(X_h^b, X_f^b; \theta_{TFN})$;
11:         $P_{TDN}^b = F(X_f^b; \theta_{TDN})$;
12:         Obtain the ensembled prediction $P^b$ by equation (14)-(16);
13:         Generate pseudo-label $\hat{Y}^b$ using $P_{TFN}^b$, $P_{TDN}^b$ by equation (14)-(17);
14:         Calculate label quality scores $S^b$ by equation (18)-(19);
15:    end for
16:    $$\mathcal{L}_s = \sum_{b\in\mathcal{B}}\sum_{t\in T}\sum_{i,j,k=1}^{L,W,H}\left[I_s \circ FC(P^{b,t}, Y^{b,t})\right]_{i,j,k}$$
17:    $$\mathcal{L}_u = \sum_{b\in\mathcal{B}}\sum_{t\in T}\sum_{i,j,k=1}^{L,W,H}\left[I_u \circ S^{b,t} \circ \left\|P^{b,t} - \hat{Y}^{b,t}\right\|_\omega\right]_{i,j,k}$$
18:    $$\mathcal{L} = \frac{1}{|\mathcal{B}||T|LWH}(\mathcal{L}_s + \lambda\mathcal{L}_u)$$
19:    Compute the gradients with respect to L by backpropagation and update $\theta_{TFN}$, $\theta_{TDN}$ using gradient decent.
20:    end while FIG. 4 is a block/flow diagram of a practical semi-supervised deep learning (DL) framework for turbulence forecasting, in accordance with embodiments of the present invention.

At block 410, the issue is using deep learning (DL) to model complex spatiotemporal relations with few and imbalance labels for turbulence forecasting.

At block 420, the exemplary embodiments introduce a practical semi-supervised DL framework for turbulence forecasting.

At block 430, the benefit of the semi-supervised DL framework for turbulence forecasting includes enabling accurate turbulence forecasting with few observations, which is achieved by blocks 422, 424, 426.

Block 422 employs a dual task-based semi-supervised DL framework.

Block 424 employs dual label guessing for pseudo-label generation.

Block 426 employs a hybrid loss function.

In summary, accurate air turbulence forecasting can help airlines avoid hazardous turbulence and guide the routes that keep passengers safe, maximize efficiency, and reduce costs. Traditional turbulence forecasting approaches heavily rely on painstakingly customized turbulence indexes, which are less effective in dynamic and complex weather conditions. The recent availability of high-resolution weather data and turbulence records allows more accurate forecasting of the turbulence in a data-driven way. However, it is a non-trivial task for developing a machine learning based turbulence forecasting system due to the following challenges: Complex spatio-temporal correlations, turbulence is caused by air movement which has strong spatio-temporal patterns, label scarcity, very limited turbulence labels can be obtained, and label imbalance, turbulence labels are highly imbalanced, with only 0.5% "severe" cases. To this end, the exemplary embodiments develop a unified semi-supervised framework, $T^2$-Net, to address the above challenges. Specifically, the exemplary embodiments first build an encoder-decoder paradigm based on the convolutional LSTM (ConvLSTM) to model the spatio-temporal correlations. Then, to tackle the label scarcity problem by leveraging the abundant unlabeled turbulence data, the exemplary embodiments propose a dual label guessing method. The dual label guessing method integrates complementary signals from the main Turbulence Forecasting task and the auxiliary Turbulence Detection task to generate pseudo-labels. These pseudo-labels are further reweighted by a heuristic label quality detector. Moreover, the exemplary embodiments devise a hybrid loss function which consists of a focal loss and weighted-L2 loss to alleviate the label imbalance issue.

Figure 5:
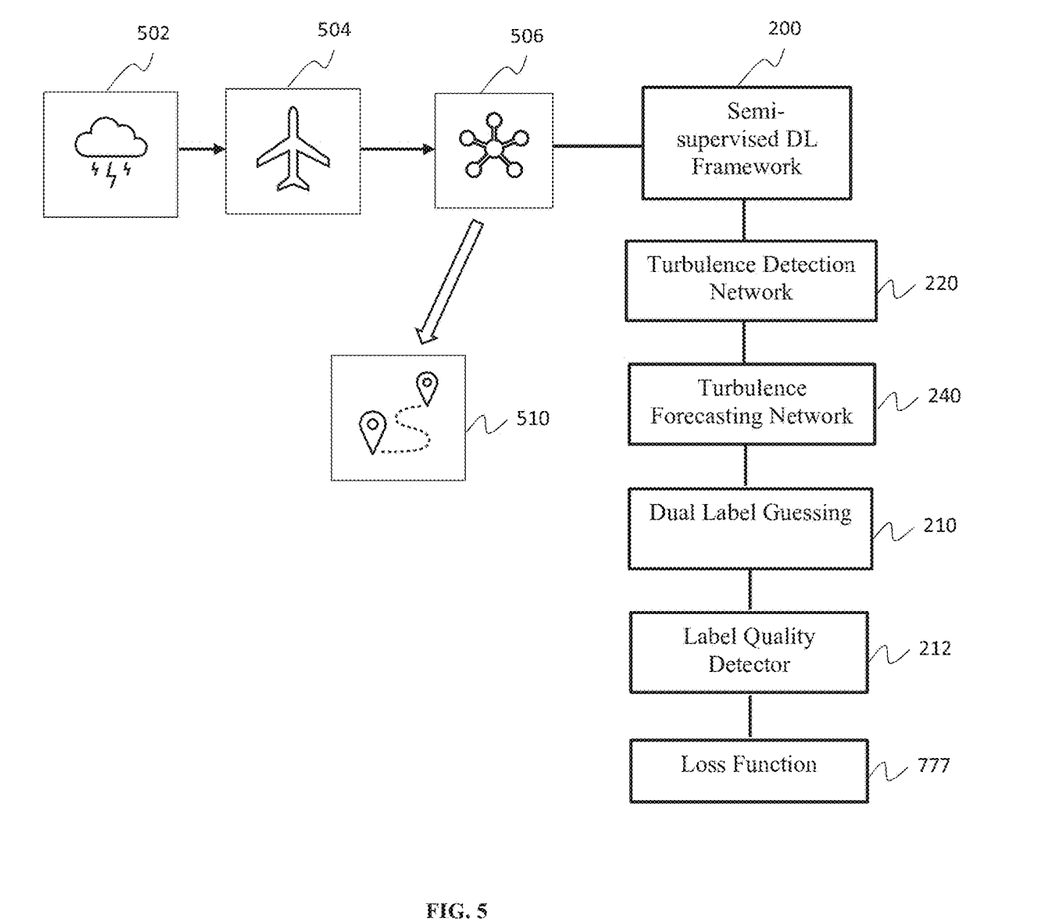
FIG. 5 is a block/flow diagram of an example practical application of the turbulence forecasting network, in accordance with embodiments of the present invention.

FIG. 5 is a block/flow diagram of an example practical application of the turbulence forecasting network, in accordance with embodiments of the present invention.

In one practical application, an airplane pilot flying an airplane 504 monitors weather patterns 502 and provides such data to a network 506, which employs the semi-supervised DL framework 200 of the exemplary embodiments of the present invention. The semi-supervised DL framework 200 implements the turbulence detection network 220 in combination with the turbulence forecasting network 240. Such networks 220, 240 employ dual label guessing 210, via a label quality detector 212 and loss function 777. The semi-supervised DL framework 200 can aid the pilot flying an airplane 504 to reroute via a different path 510 to avoid, e.g., inclement weather that can cause air turbulence.

Figure 6:
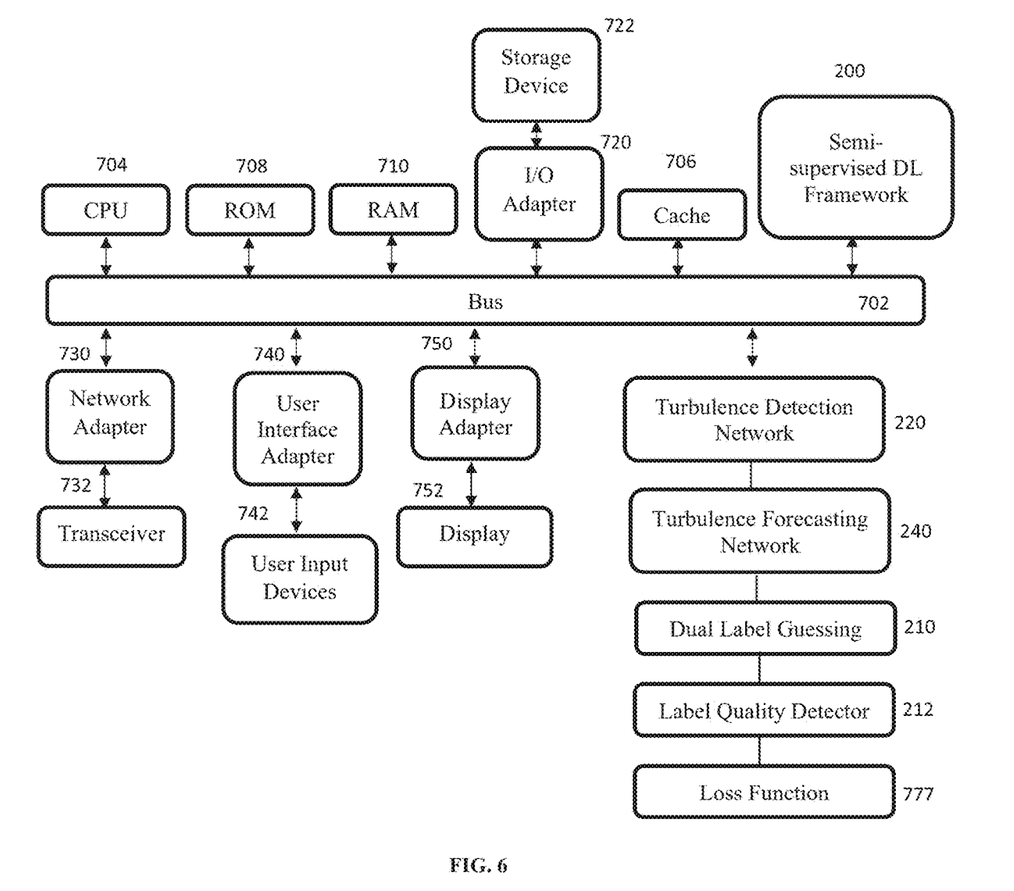
FIG. 6 is block/flow diagram of an exemplary processing system for the turbulence forecasting network, in accordance with embodiments of the present invention.

FIG. 6 is block/flow diagram of an exemplary processing system for the turbulence forecasting network, in accordance with embodiments of the present invention.

The processing system includes at least one processor or processor device (CPU) 704 operatively coupled to other components via a system bus 702. A cache 706, a Read Only Memory (ROM) 708, a Random Access Memory (RAM) 710, an input/output (I/O) adapter 720, a network adapter 730, a user interface adapter 740, and a display adapter 750, are operatively coupled to the system bus 702. The semi-supervised DL framework 200 can be connected to bus 702. The semi-supervised DL framework 200 implements the turbulence detection network 220 in combination with the turbulence forecasting network 240. Such networks 220, 240 employ dual label guessing 210, via a label quality detector 212 and loss function 777.

A storage device 722 is operatively coupled to system bus 702 by the I/O adapter 720. The storage device 722 can be any of a disk storage device (e.g., a magnetic or optical disk storage device), a solid state magnetic device, and so forth.

A transceiver 732 is operatively coupled to system bus 702 by network adapter 730.

User input devices 742 are operatively coupled to system bus 702 by user interface adapter 740. The user input devices 742 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 742 can be the same type of user input device or different types of user input devices. The user input devices 742 are used to input and output information to and from the processing system.

A display device 752 is operatively coupled to system bus 702 by display adapter 750.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
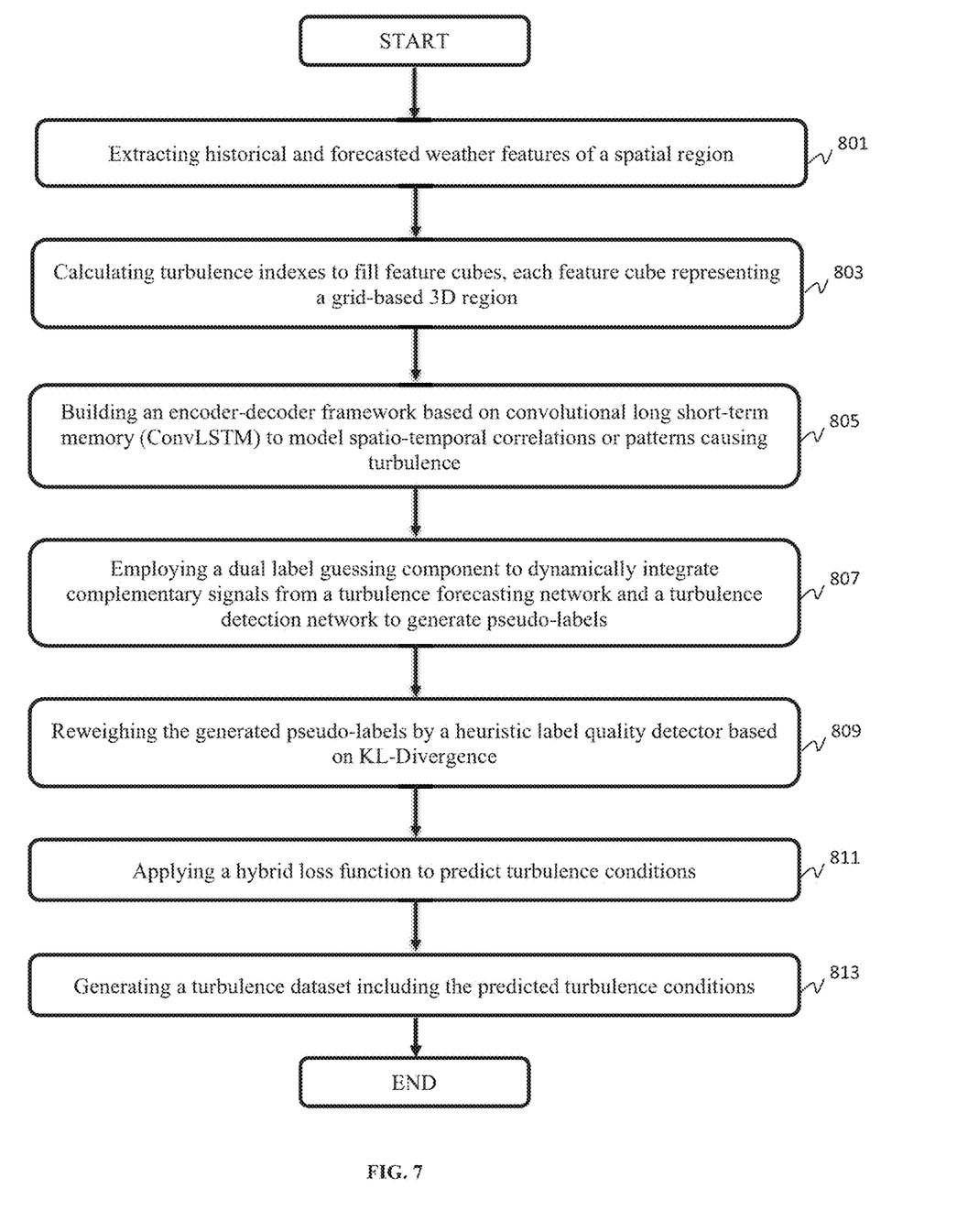
FIG. 7 is a block/flow diagram of an exemplary method for implementing the turbulence forecasting network, in accordance with embodiments of the present invention.

FIG. 7 is a block/flow diagram of an exemplary method for implementing the turbulence forecasting network, in accordance with embodiments of the present invention.

At block 801, extract historical and forecasted weather features of a spatial region.

At block 803, calculate turbulence indexes to fill feature cubes, each feature cube representing a grid-based 3D region.

At block 805, build an encoder-decoder framework based on convolutional long short-term memory (ConvLSTM) to model spatio-temporal correlations or patterns causing turbulence.

At block 807, employ a dual label guessing component to dynamically integrate complementary signals from a turbulence forecasting network and a turbulence detection network to generate pseudo-labels.

At block 809, reweigh the generated pseudo-labels by a heuristic label quality detector based on KL-Divergence.

At block 811, apply a hybrid loss function to predict turbulence conditions.

At block 813, generate a turbulence dataset including the predicted turbulence conditions.

Therefore, a unified semi-supervised learning framework is introduced for accurate turbulence forecasting, named $T^2$-Net. $T^2$-Net builds an encoder-decoder paradigm based on Convolutional LSTM (ConvLSTM) to model the complex spatiotemporal patterns that cause turbulence. Then, to fully utilize the unlabeled data, besides the main task of turbulence forecasting, the exemplary embodiments introduce an auxiliary task, turbulence detection, and introduce a dual label guessing method which dynamically integrates complementary signals from these two tasks to generate robust pseudo-labels. These pseudo-labels are then treated as ground truth and added into the training loop for better generalization ability. To minimize the effect of "bad" pseudo-labels, the exemplary embodiments introduce a heuristic label quality detector based on KL-Divergence and reweights data based on the calculated quality score. Furthermore, to alleviate the label imbalance issue, the exemplary embodiments devise a hybrid loss function which includes a focal loss for the labeled data and weighted-L2 for the pseudo-labels.

Figure 8:
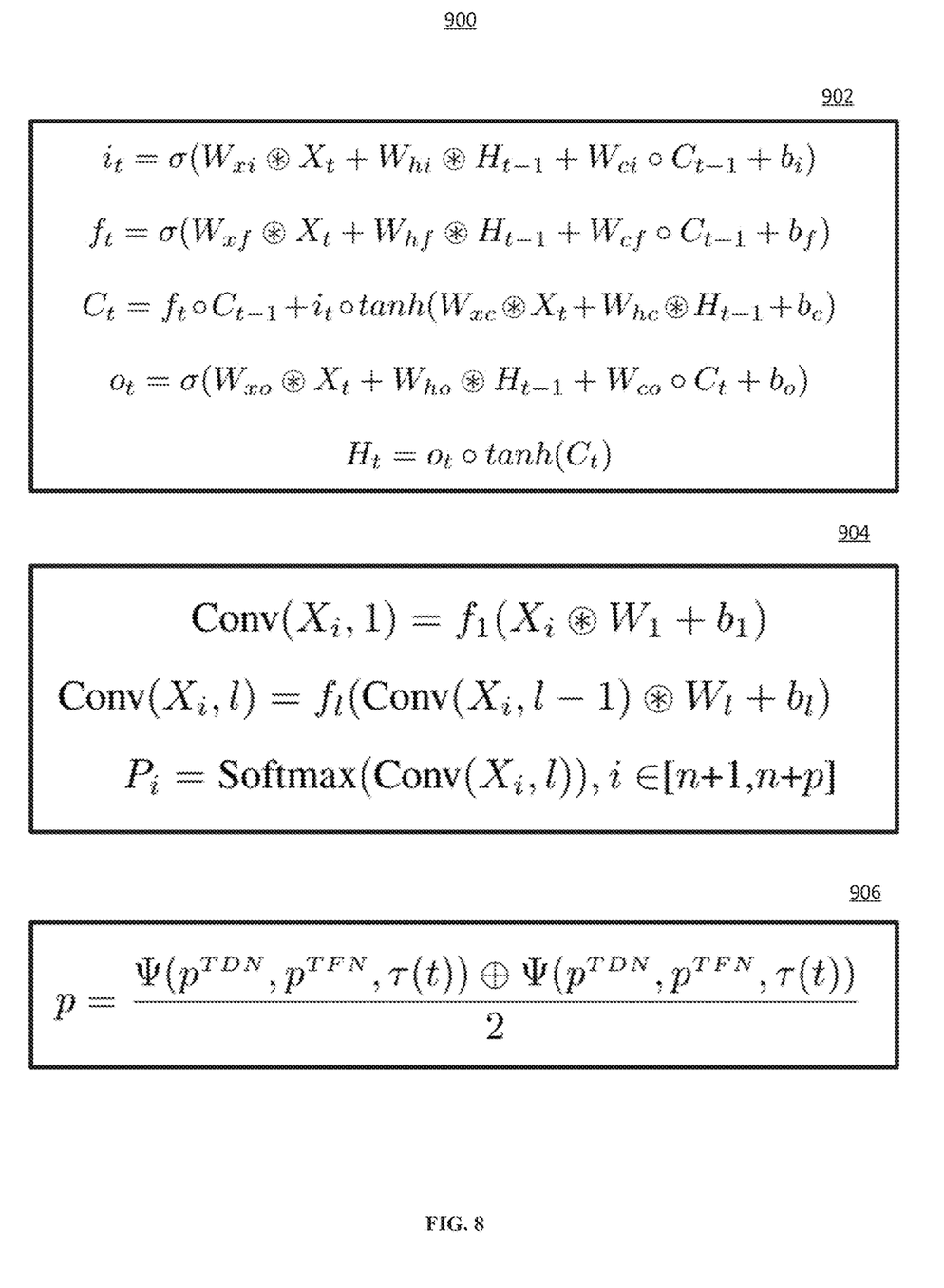
FIG. 8 is a block/flow diagram of exemplary equations employed for the turbulence forecasting network, turbulence detection network, and dual label guessing, in accordance with embodiments of the present invention.

FIG. 8 is a block/flow diagram of exemplary equations employed for the turbulence forecasting network, turbulence detection network, and dual label guessing, in accordance with embodiments of the present invention.

Equations 900 illustrate the turbulence forecasting network equations 902, the turbulence detection network equations 904, and dual label guessing equations 906.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Having thus described aspects of the invention, with the details and particularity required by the patent laws, what is claimed and desired protected by Letters Patent is set forth in the appended claims:

1. A computer-implemented method executed on a processor for employing a unified semi-supervised deep learning (DL) framework for turbulence forecasting, the method comprising:
   extracting historical and forecasted weather features of a spatial region;
   calculating turbulence indexes from the extracted historical and forecasted weather features to fill feature cubes, each feature cube representing a grid-based 3D region;
   building an encoder-decoder framework taking as input the feature cubes, and based on convolutional long short-term memory (ConvLSTM) to model spatio-temporal correlations or patterns causing turbulence;
   employing a dual label guessing component to dynamically integrate complementary signals from a turbulence forecasting network and a turbulence detection network to generate pseudo-labels;
   reweighing the generated pseudo-labels by a heuristic label quality detector based on KL-Divergence;
   applying a hybrid loss function to the pseudo-labels generated by the dual label guessing component to predict turbulence conditions; and
   generating a turbulence dataset including the predicted turbulence conditions.

2. The method of claim 1, wherein forecasted turbulence feature cubes are fed into the turbulence detection network.

3. The method of claim 2, wherein the turbulence detection network outputs detected turbulence level cubes.

4. The method of claim 1, wherein the pseudo-labels are generated for unlabeled grids based on the turbulence forecasting network and the turbulence detection network, are coupled with corresponding features as ground truth, and added to training data included in the turbulence dataset.

5. The method of claim 1, wherein the heuristic label quality detector calculates a quality score for each grid.

6. The method of claim 1, wherein the hybrid loss function includes a supervised loss for labeled grids and an unsupervised loss for grids with pseudo-labels.

7. The method of claim 1, wherein the turbulence forecasting network and the turbulence detection network are co-trained in a semi-supervised manner.

8. A non-transitory computer-readable storage medium comprising a computer-readable program for employing a unified semi-supervised deep learning (DL) framework for turbulence forecasting, wherein the computer-readable program when executed on a computer causes the computer to perform the steps of:
   extracting historical and forecasted weather features of a spatial region;
   calculating turbulence indexes from the extracted historical and forecasted weather features to fill feature cubes, each feature cube representing a grid-based 3D region;
   building an encoder-decoder framework taking as input the feature cubes, and based on convolutional long short-term memory (ConvLSTM) to model spatio-temporal correlations or patterns causing turbulence;
   employing a dual label guessing component to dynamically integrate complementary signals from a turbulence forecasting network and a turbulence detection network to generate pseudo-labels;
   reweighing the generated pseudo-labels by a heuristic label quality detector based on KL-Divergence;
   applying a hybrid loss function to the pseudo-labels generated by the dual label guessing component to predict turbulence conditions; and
   generating a turbulence dataset including the predicted turbulence conditions.

9. The non-transitory computer-readable storage medium of claim 8, wherein forecasted turbulence feature cubes are fed into the turbulence detection network.

10. The non-transitory computer-readable storage medium of claim 9, wherein the turbulence detection network outputs detected turbulence level cubes.

11. The non-transitory computer-readable storage medium of claim 8, wherein the pseudo-labels are generated for unlabeled grids based on the turbulence forecasting network and the turbulence detection network, are coupled with corresponding features as ground truth, and added to training data included in the turbulence dataset.

12. The non-transitory computer-readable storage medium of claim 8, wherein the heuristic label quality detector calculates a quality score for each grid.

13. The non-transitory computer-readable storage medium of claim 8, wherein the hybrid loss function includes a supervised loss for labeled grids and an unsupervised loss for grids with pseudo-labels.

14. The non-transitory computer-readable storage medium of claim 8, wherein the turbulence forecasting network and the turbulence detection network are co-trained in a semi-supervised manner.

15. A system for employing a unified semi-supervised deep learning (DL) framework for turbulence forecasting, the system comprising:
   a memory; and
   one or more processors in communication with the memory configured to:
      extract historical and forecasted weather features of a spatial region;
      calculate turbulence indexes from the extracted historical and forecasted weather features to fill feature cubes, each feature cube representing a grid-based 3D region;
      build an encoder-decoder framework taking as input the feature cubes, and based on convolutional long short-term memory (ConvLSTM) to model spatio-temporal correlations or patterns causing turbulence;
      employ a dual label guessing component to dynamically integrate complementary signals from a turbulence forecasting network and a turbulence detection network to generate pseudo-labels;
      reweigh the generated pseudo-labels by a heuristic label quality detector based on KL-Divergence;
      apply a hybrid loss function to the pseudo-labels generated by the dual label guessing component to predict turbulence conditions; and
      generate a turbulence dataset including the predicted turbulence conditions.

16. The system of claim 15, wherein forecasted turbulence feature cubes are fed into the turbulence detection network.

17. The system of claim 16, wherein the turbulence detection network outputs detected turbulence level cubes.

18. The system of claim 15, wherein the pseudo-labels are generated for unlabeled grids based on the turbulence forecasting network and the turbulence detection network, are coupled with corresponding features as ground truth, and added to training data included in the turbulence dataset.

19. The system of claim 15, wherein the heuristic label quality detector calculates a quality score for each grid.

20. The system of claim 15, wherein the hybrid loss function includes a supervised loss for labeled grids and an unsupervised loss for grids with pseudo-labels.

* * * * *